P. N. HARTS.
Corn-Husking Gloves.
No. 137,918.                                              Patented April 15, 1873.
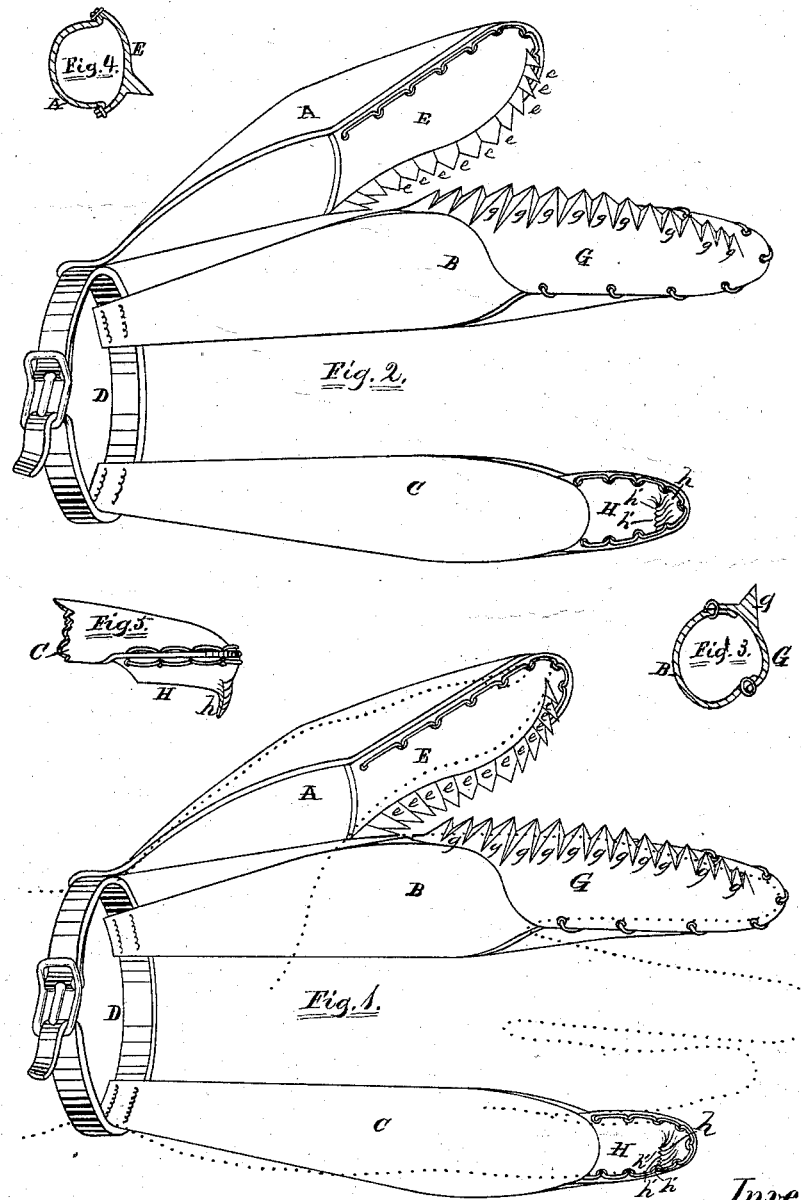
Witnesses:
Platt R. Richards,
J. J. Tunnicliff
Inventor:
Perry N. Harts,
By W. B. Richards

UNITED STATES PATENT OFFICE.

PERRY N. HARTS, OF FRENCH GROVE, ILLINOIS.

IMPROVEMENT IN CORN-HUSKING GLOVES.

Specification forming part of Letters Patent No. 137,918, dated April 15, 1873; application filed October 24, 1872.

*To all whom it may concern:*

Be it known that I, PERRY N. HARTS, of French Grove, county of Peoria and State of Illinois, have invented certain Improvements in Corn-Husking Pin and Shield, of which the following is a specification:

Nature and Objects of the Invention.

The nature of my invention relates to improvements in devices for husking corn by hand; and the invention consists in the construction and arrangement of metal plates to be used on the thumb, fore, and little fingers of the left hand, for the double purpose of stripping the husk from the corn and protecting the hand during the operation, all as hereinafter more fully set forth.

Description of the Accompanying Drawing.

Figure 1 is a perspective view of my invention, showing its position on a dotted outline hand. Fig. 2 is the device alone. Fig. 3 is a sectional view of the first finger. Fig. 4 is a sectional view of the thumb-shield, and Fig. 5 is a side view of the little-finger shield.

In the drawing, A B C represent shields of leather on the backs of the thumb, fore-finger, and little finger, respectively, and secured together by a strap, D, which passes around the wrist, and is secured by a buckle, as shown. E is a metallic plate secured to the thumb-strap A, as shown at Figs. 1, 2, and 4, and provided longitudinally with a series of teeth, $e$ $e$ $e$ $e$. G is a metallic plate, secured to the fore-finger strap B, as shown at Figs. 1, 2, and 4, and having a row of projecting teeth, $g$ $g$ $g$ $g$ $g$ $g$. H is a short metallic plate, secured, as shown, to the outer end and inner side of the shield C, and having a projecting pin, $h$, on its face, curved as shown, and provided with teeth $h'$ $h'$ $h'$ on its outer end.

In operation any ordinary husking-peg may be used on the right hand, if desired, and the ear with the husk on may be seized near its upper or outer end by the left hand, when, by means of the teeth $e$ $g$ and pin $h$, the husks may be torn apart, stripped from the ear, and turned down to proper position for being broken from the ear. The ear may be taken hold of in various ways by the left hand, and the husking-teeth $e$ $g$ and pin $h$ utilized, with the leathers A B C, for removing the husks, and at the same time shielding and protecting the hand from all injury from the husks, and a common husking-peg may be held in the right hand, to be used in the ordinary way, when desired.

Claim.

The plate E having teeth $e$, plate G having teeth $g$, and plate H having the toothed pin $h$ when secured to leathers, and arranged for operation on the left hand, in the manner substantially as and for the purpose specified.

PERRY N. HARTS.

Witnesses:
   J. J. TUNNICLIFF,
   PLATT R. RICHARDS.